(12) United States Patent
Lu et al.

(10) Patent No.: US 8,887,894 B2
(45) Date of Patent: Nov. 18, 2014

(54) TRANSFERRING MECHANISM

(71) Applicants: Fu Ding Electronical Technology (Jiashan) Co., Ltd., Zhejiang (CN); Hon Hai Precision Industry Co., Ltd., New Taipei (TW)

(72) Inventors: Jian-Qiang Lu, Shenzhen (CN); Jian-Hua Xu, Shenzhen (CN)

(73) Assignees: Fu Ding Electronical Technology (Jiashan) Co., Ltd., Zhejiang (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/927,361

(22) Filed: Jun. 26, 2013

(65) Prior Publication Data

US 2014/0027244 A1 Jan. 30, 2014

(30) Foreign Application Priority Data

Jul. 26, 2012 (CN) ...................... 2012 2 0365173 U

(51) Int. Cl.
| | |
|---|---|
| *B65G 47/84* | (2006.01) |
| *B65G 47/64* | (2006.01) |
| *B65G 47/90* | (2006.01) |
| *B65G 47/52* | (2006.01) |

(52) U.S. Cl.
CPC ............ *B65G 47/642* (2013.01); *B65G 47/902* (2013.01); *B65G 47/52* (2013.01)
USPC ..................................... 198/463.3; 198/468.6

(58) Field of Classification Search
CPC .. B65G 47/5131; B65G 15/26; B65G 47/647; B65G 47/52; B65G 25/00; B65G 25/04
USPC ............. 198/457.01, 597, 817, 463.2, 463.3, 198/468.6
See application file for complete search history.

(56) References Cited

U.S. PATENT DOCUMENTS

| | | | | |
|---|---|---|---|---|
| 3,690,435 | A * | 9/1972 | King et al. .................. | 198/463.3 |
| 6,223,884 | B1 * | 5/2001 | Ronchi ..................... | 198/457.01 |
| 6,796,788 | B2 * | 9/2004 | Gallagher .................. | 198/463.3 |
| 8,425,833 | B2 * | 4/2013 | Lemon et al. ................. | 148/423 |
| 8,430,229 | B2 * | 4/2013 | Abbestam .................. | 198/463.3 |
| 8,708,133 | B2 * | 4/2014 | Izquierdo Ereno et al. .. | 198/456 |

* cited by examiner

*Primary Examiner* — James R Bidwell
(74) *Attorney, Agent, or Firm* — Novak Druce Connolly Bove + Quigg LLP

(57) ABSTRACT

A transferring mechanism includes a first transferring assembly, a second transferring assembly, and a catcher. The first transferring assembly and the second transferring assembly are arranged side by side. A transferring direction of the first transferring assembly is opposite to a transferring direction of the second transferring assembly. The catcher includes a pair of mounting blocks, a guiding member, a sliding member, a telescoping member, and a clamping member. The mounting blocks are positioned on the first transferring assembly and the second transferring assembly. Opposite ends of the guiding member are mounted on the pair of mounting blocks, the guiding member across the first transferring assembly and the second transferring assembly. The sliding member is slidably sleeved on the guiding member. The telescoping member is mounted on the sliding member. The catcher is mounted on the telescoping member for clamping a workpiece on the first transferring assembly.

20 Claims, 5 Drawing Sheets

TRANSFERRING MECHANISM

BACKGROUND

1. Technical Field

The present disclosure relates to transferring mechanisms, and particularly, to a transferring mechanism for transferring workpiece.

2. Description of Related Art

Belt conveyer may be used to automatically transfer workpieces from a previous process to another process. However, the belt conveyer cannot be drastically bent, such as bent 90 degrees, for example. Therefore, the belt conveyer may only be arranged in a substantially straight line, and thus a lot of space is needed for placing the belt conveyer.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
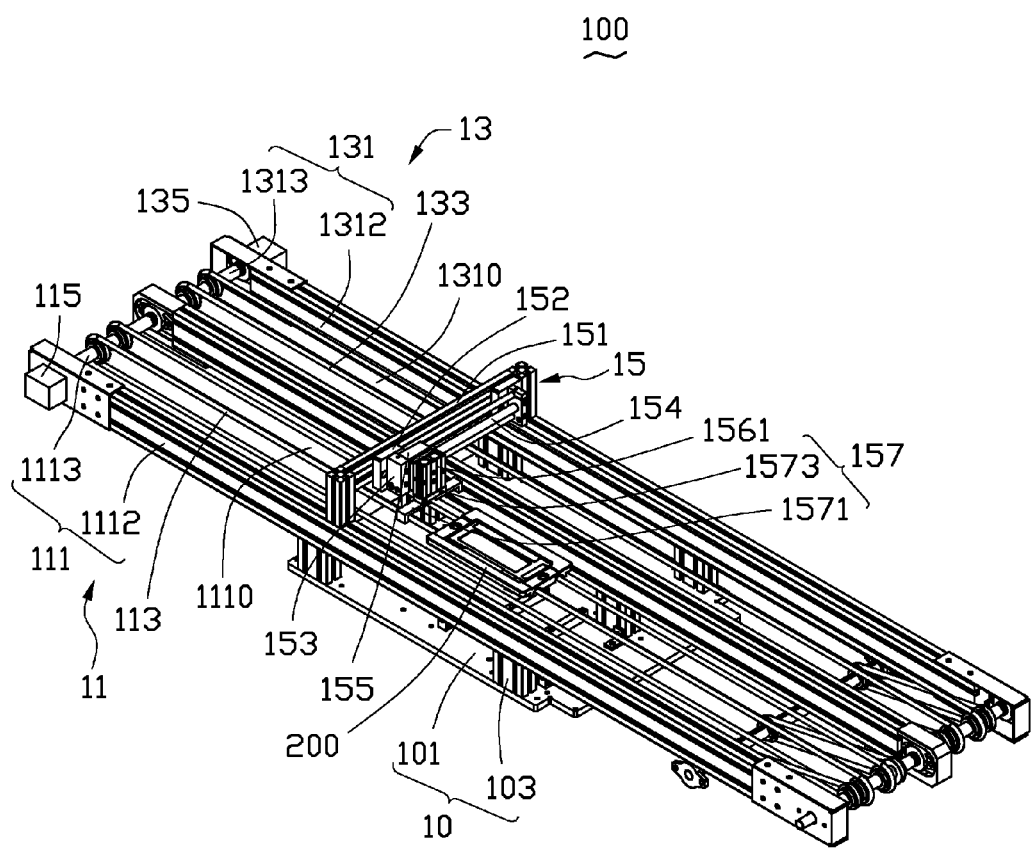
FIG. 1 is an isometric view of an embodiment of a transferring mechanism in a first state of use.
Figure 2:
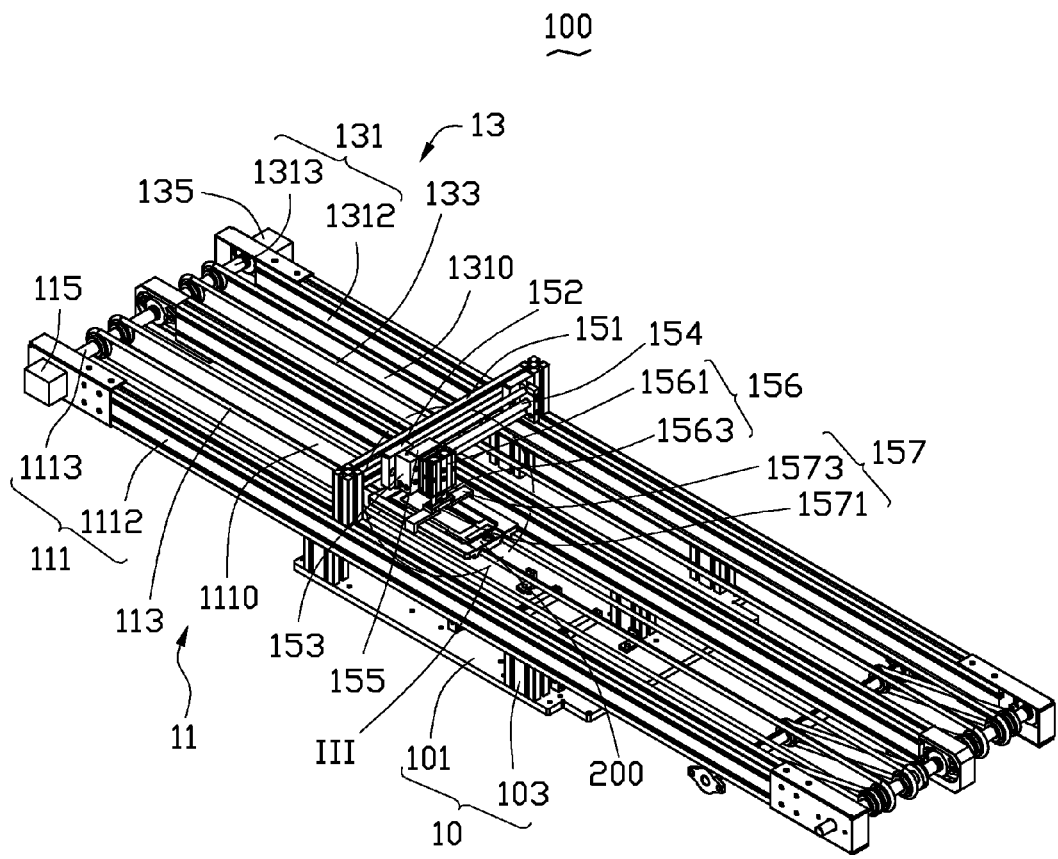
FIG. 2 is an isometric view of the transferring mechanism in FIG. 1 in a second state of use.
Figure 3:
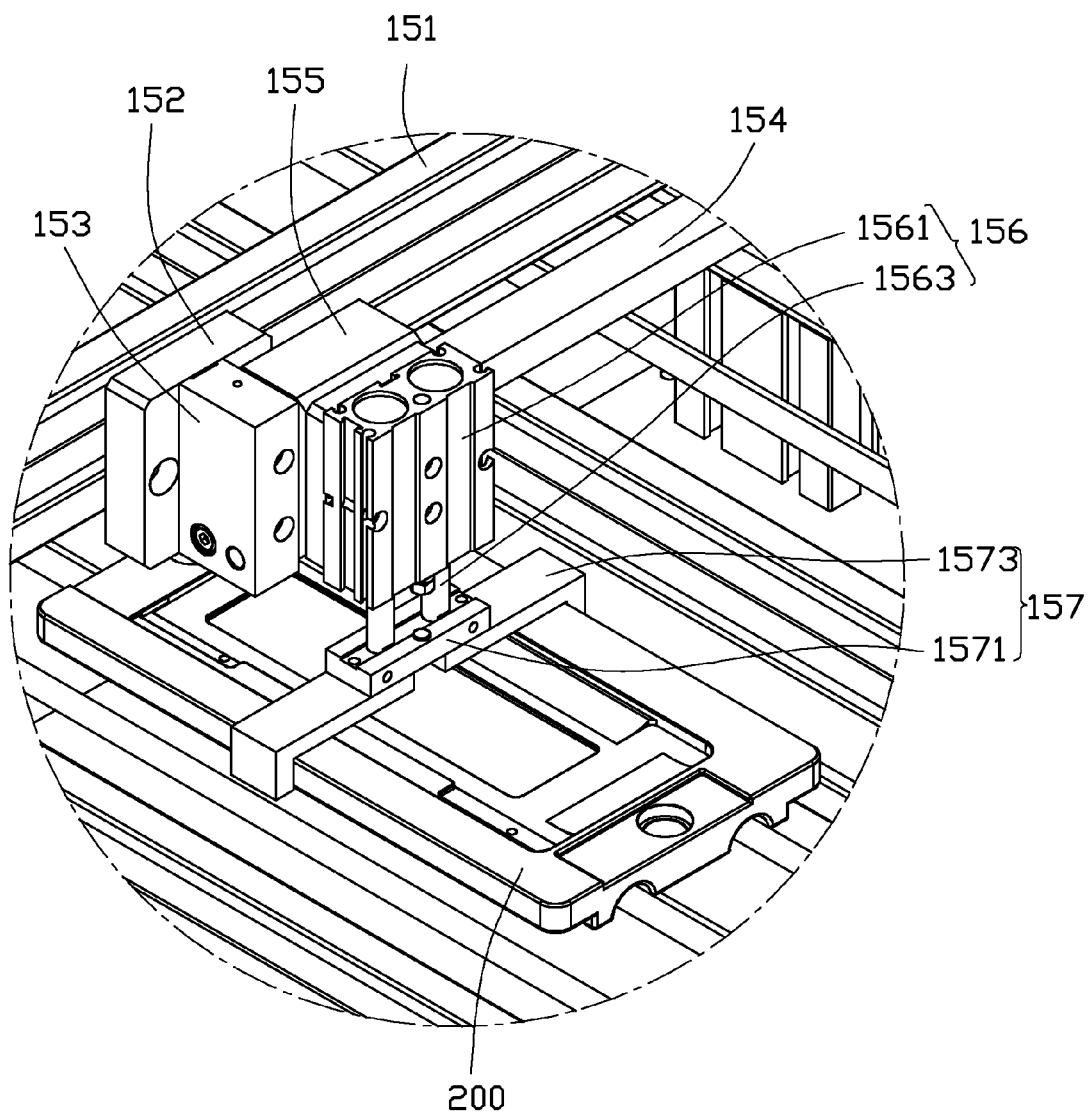
FIG. 3 is an enlarged view of circle III in FIG. 2.

FIGS. 1 to 3 show one embodiment of a transferring mechanism 100. The transferring mechanism 100 is configured to transfer workpieces 200. The transferring mechanism 100 includes a supporting assembly 10, a first transferring assembly 11, a second transferring assembly 13, and a clamping assembly 15. The first transferring assembly 11 and the second transferring assembly 13 are positioned on the supporting assembly 10 side by side, and are parallel to each other. The clamping assembly 15 is located above the first transferring assembly 11 and the second transferring assembly 13. The supporting assembly 10 includes a bottom plate 101 and a supporting member 103 substantially perpendicularly fixed on the bottom plate 101. The supporting member 103 is configured to support the first transferring assembly 11 and the second transferring assembly 13. In the illustrated embodiment, the supporting member 103 includes six posts.

The first transferring assembly 11 includes a first mounting member 111, a first conveying member 113 mounted on the first mounting member 111, and a first driving member 115 connected to the first conveying member 113. The first mounting member 111 is substantially a frame, and is positioned on the supporting member 103. The first mounting member 111 includes a first positioning portion 1112 and a pair of first slave portions 1113. The first positioning portion 1112 includes two fixing rods parallel to and arranged apart from each other. The first slave portions 1113 are positioned at opposite ends of the first positioning portion 1112, and parallel to each other. The first slave portions 1113 are perpendicular to the first positioning portion 1112. The first positioning portion 1112 and the first slave portions 1113 define a first receiving chamber 1110, cooperatively. The first driving member 115 is connected to one of the first slave portions 1113, for rotating the first slave portion 1113.

Opposite ends of the first conveying member 113 winds on the first slave portions 1113, and is received in the first receiving chamber 1110. The first conveying member 113 moves along a direction from one end of the first positioning portion 1112 to the other end of the first positioning portion 1112 driven by the slave portion 1113 connected with the first driving member 115, for transferring workpieces 200. In the illustrated embodiment, the first conveying member 113 includes a pair of belts arranged parallel to each other. The first driving member 115 is a rotation cylinder.

The second transferring assembly 13 has similar structures to the first transferring assembly 11. The second transferring assembly 13 includes a second mounting member 131, a second conveying member 133 mounted on the second mounting member 131, and a second driving member 135 connected to the second conveying member 133. The second mounting member 131 is substantially a frame, and is positioned on the supporting member 103. The second mounting member 131 includes a second positioning portion 1312 and a pair of second slave portions 1313. The second positioning portion 1312 is parallel to and arranged besides the first positioning portion 1112, and includes two fixing rods parallel to and arranged apart from each other. In the illustrated embodiment, the first positioning portion 1112 and the second positioning portion 1312 is integrated together, and share one fixing rod. The second slave portions 1313 are positioned at opposite ends of the second positioning portion 1312, parallel to each other. The second positioning portion 1312 and the second slave portions 1313 cooperatively define a second receiving chamber 1310. The second driving member 135 is connected to one of the second slave portions 1313, for rotating the second slave portion 1313.

Opposite ends of the second conveying member 133 winds on the second slave portions 1313, and is received in the second receiving chamber 1310. The second conveying member 133 moves along a direction from one end of the second positioning portion 1312 to the other end of the second positioning portion 1312 driven by the second slave portion 1313 connected with the second driving member 135, for transferring the workpieces 200. A moving direction of the second conveying member 133 is opposite to a moving direction of the first conveying member 131.

The clamping assembly 15 includes a fixing frame 151, a pair of positioning blocks 152, a pair of mounting blocks 153, a guiding member 154, a sliding member 155, a telescoping member 156 (shown in FIGS. 2 and 3), and a catcher 157. The fixing frame 151 is located above the first positioning portion 1112 and the second positioning portion 1312. An end of the fixing frame 151 is fastened on a side of the first positioning portion 1112 away from the second positioning portion 1312, an opposite end is fastened on a side of the second positioning portion 1312 away from the first positioning portion 1112. The positioning blocks 152 are respectively positioned at the fixing frame 151 adjacent to opposite ends. The mounting blocks 153 are mounted on the positioning blocks 152, respectively. The guiding member 154 is substantially a rod, and two ends thereof are respectively positioned on the mounting blocks 153. The guiding member 154 is positioned across the first conveying member 113 and the second conveying member 133.

The sliding member 155 is sleeved on the guiding member 154, and is capable of sliding along the guiding member 154. The telescoping member 156 includes a first driving portion 1561 and a telescoping portion 1563 (shown in FIGS. 2 and 3). The first driving portion 1561 is mounted on a side of the sliding member 155 away from the fixing frame 151. The telescoping portion 1563 is formed at an end of the first driving portion 1561 towards the first conveying member 113. The first driving portion 1561 drives the telescoping portion 1563 to telescope along a direction perpendicular to the first conveying member 113.

The catcher 157 includes a second driving portion 1571 and a clamping portion 1573. The second driving portion 1571 is fixed on an end of the telescoping portion 1563 away from the first driving portion 1561. The clamping portion 1573 is formed at an end of the second driving portion 1571 away from the telescoping portion 1563. The second driving portion 1571 drives the clamping portion 1573 to clamp or release the workpiece 200. The clamping portion 1573 includes a pair of claws, and a distance between the claws is equal to a width of the workpiece 200. In the illustrated embodiment, the sliding member 155, the telescoping member 156, and the second driving portion 1571 are cylinders. In an alternative embodiment, the fixing frame 151 and the positioning blocks 152 may be omitted, and one of the mounting blocks 153 may be mounted on the side of the first positioning portion 1112 away from the second positioning portion 1312. The other one of the mounting blocks may be mounted on the side of the second positioning portion 1312 away from the first positioning portion 1112.

In assembly, the first mounting member 111 and the second mounting member 131 are arranged side by side. The first conveying member 113 and the second conveying member 133 are respectively wound on the first mounting member 111 and the second mounting member 131. The first driving member 115 and the second driving member 135 respectively connect the first slave portion 1113 and the second slave portion 1313. The fixing frame 151 is fixed respectively on the first positioning portion 1112 and the positioning mounting portion 1312. The positioning blocks 12 are mounted on the fixing frame 151. The mounting blocks 153 are respectively mounted on the positioning blocks 152. Two ends of the guiding member 154 are positioned on the mounting blocks 153. The sliding member 155 is sleeved on the guiding member 154. The telescoping member 156 is mounted on the sliding member 155. The catcher 157 is fixed on an end of the telescoping portion 1563 away from the first driving portion 1561.

In use, the workpieces 200 are put on the first conveying member 113, and are conveyed towards the transferring assembly 15. The instant, the sliding member 155 positions the telescoping member 156 and the catcher 157 above the first conveying member 113. The first driving portion 1561 drives the telescoping portion 1563 to telescope towards the first driving portion 1561, and the telescoping portion 1563 drives the catcher 157 to be located above the first conveying member 113. The transferring mechanism 100 is in a first state of use (shown in FIG. 1).

When the workpieces 200 are conveyed under the catcher 157, the first driving portion 1561 drives the telescoping portion 1563 towards the first conveying member 113, and the clamping portion 1573 is driven to the workpiece 200. The second driving portion 1571 drives the clamping portion 1573 to clamp the workpiece 200. The transferring mechanism 100 is in a second state of use (shown in FIG. 2).

Figure 4:
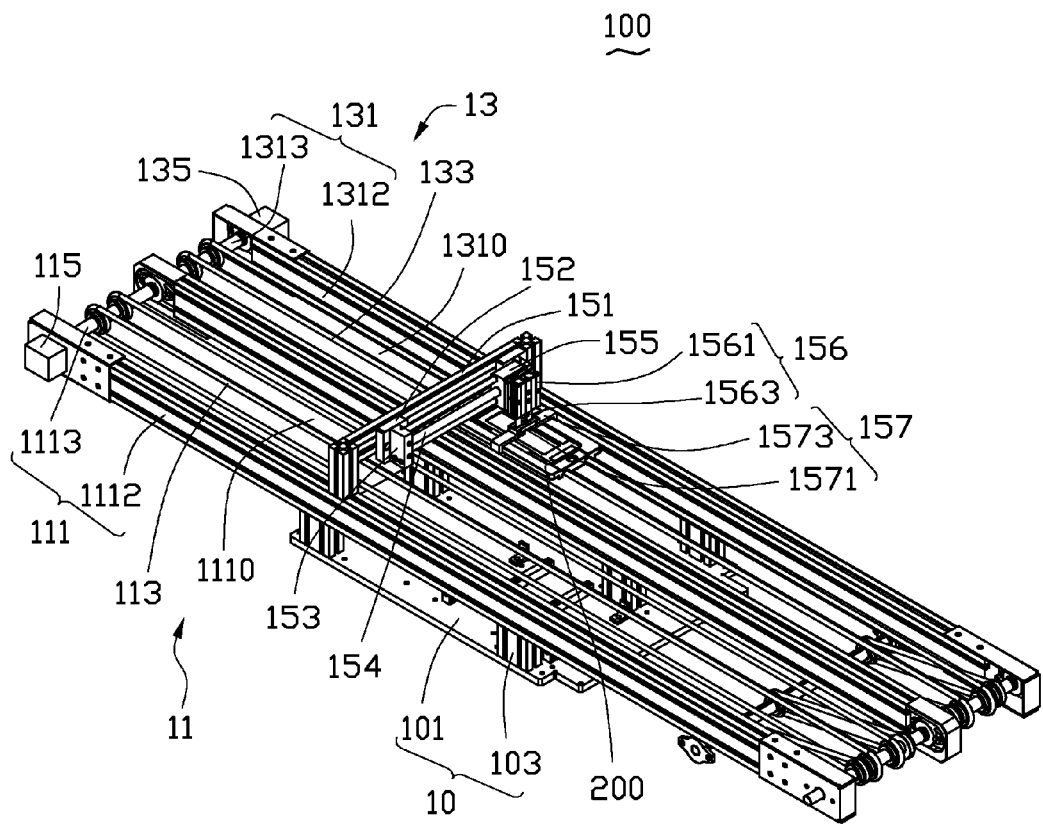
FIG. 4 is an isometric view of the transferring mechanism in FIG. 1 in a third state of use.

The first driving portion 1561 drives the telescoping portion 1563 to move towards the first driving portion 1561, and the telescoping portion 1563 drives the catcher 157 to move to be located above the first conveying member 113. The sliding member 155 drives the telescoping member 156 and the catcher 157 to slide to be located above the second conveying member 133. Then the first driving portion 1561 drives the telescoping portion 1563 to move towards the second conveying member 133, and the catcher 157 is driven to move towards the second conveying member 133 until the workpiece 200 is located on the second conveying member 133. The transferring mechanism 100 is in a third state of use (shown in FIG. 4).

Figure 5:
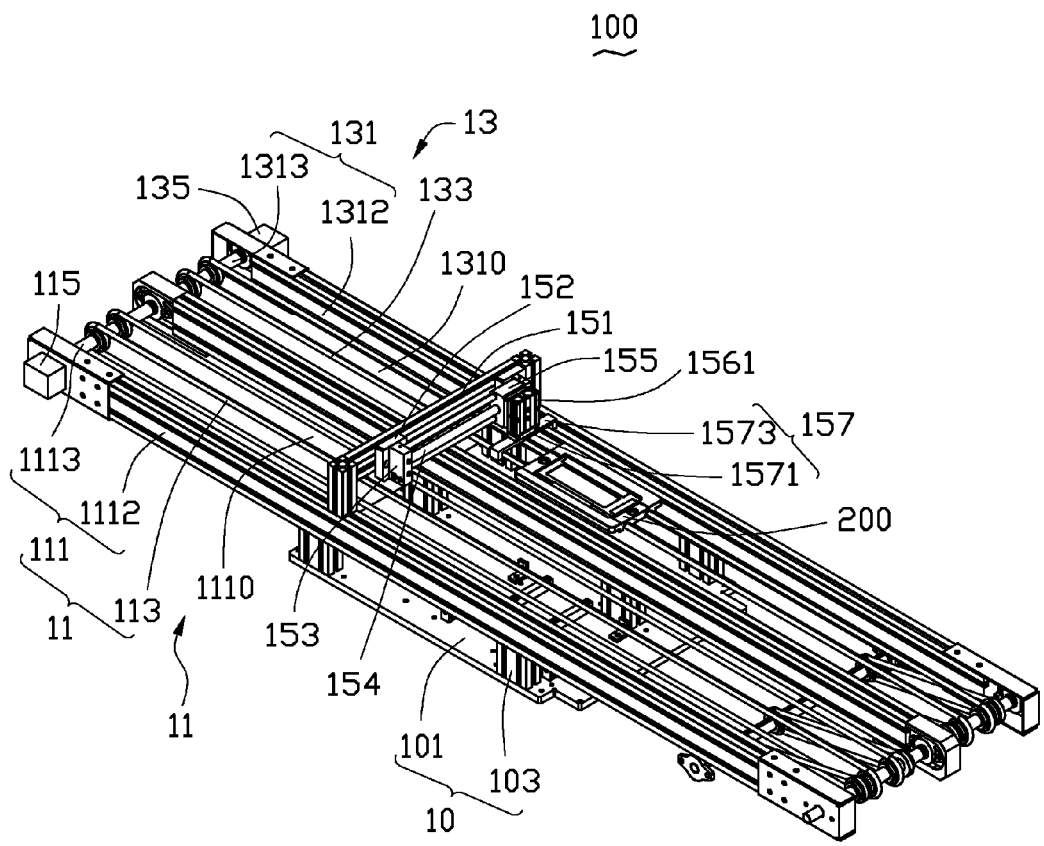
FIG. 5 is an isometric view of the transferring mechanism in FIG. 1 in a fourth state of use.

The second driving portion 1571 drives the clamping portion 1573 to release the workpiece 200, and the first driving portion 1561 drives the telescoping portion 1563 to move towards the first driving portion 1561, and thus the catcher 157 is driven to move towards the first driving portion 1561. The workpiece 200 is then conveyed on the second conveying member 133. The transferring mechanism 100 is in a fourth state of use (shown in FIG. 5).

It is believed that the present embodiments and their advantages will be understood from the foregoing description, and it will be apparent that various changes may be made thereto without departing from the spirit and scope of the embodiments or sacrificing all of its material advantages.

What is claimed is:

1. A transferring mechanism, comprising:
   a supporting assembly;
   a first transferring assembly;
   a second transferring assembly, the second transferring assembly and the first transferring assembly arranged on the supporting assembly side by side, a transferring direction of the first transferring assembly opposite to a transferring direction of the second transferring assembly; and
   a catcher comprising a pair of mounting blocks, a guiding member, a sliding member, a telescoping member, and a clamping member, wherein one of the pair of mounting blocks is positioned on a side of the first transferring assembly away from the second transferring assembly, the other one of the pair of mounting blocks is positioned on a side of the second transferring assembly away from the first transferring assembly, opposite ends of the guiding member are mounted on the pair of mounting blocks, respectively, and the guiding member is positioned across the first transferring assembly and the second transferring assembly, the sliding member is slidably sleeved on the guiding member, the telescoping member is mounted on the sliding member, the catcher is mounted on the telescoping member for clamping a workpiece on the first transferring assembly, the telescoping member is capable of driving the catcher to stretch perpendicularly to the first transferring assembly, and the sliding member is capable of driving the telescoping member and the catcher to slide along the guiding member, for transferring the workpiece to the second transferring assembly.

2. The transferring mechanism of claim 1, wherein the telescoping member comprises a first driving portion and a telescoping portion, the first driving portion is mounted on the sliding member, the telescoping portion is formed on an end of the first driving portion adjacent to the first transferring assembly, the catcher is fixed on the telescoping portion, and the first driving portion is capable of driving the telescoping portion to telescope perpendicularly to the first transferring assembly.

3. The transferring mechanism of claim 1, wherein the catcher comprises a second driving portion and a clamping portion, the second driving portion is mounted on the telescoping member, the clamping portion is formed on an end of the second driving portion adjacent to the first transferring assembly, and the second driving portion is capable of driving the clamping portion to clamp or release the workpiece.

4. The transferring mechanism of claim 3, wherein the clamping portion comprises a pair of claws.

5. The transferring mechanism of claim 3, wherein each of the sliding member, the telescoping member, and the second driving portion comprises a cylinder.

6. The transferring mechanism of claim 4, wherein the first transferring assembly comprises a first mounting member, a first conveying member, and a first driving member, the first conveying member is mounted on the first mounting member, the first driving member drives the first conveying member to move, the second transferring assembly comprises a second mounting member, a second conveying member, and a second driving member, the second conveying member is mounted on the second mounting member, the second driving member drives the second conveying member to move, the first mounting member and the second mounting member are arranged side by side, a transferring direction of the first conveying member is opposite to a transferring direction of the second conveying member, one of the pair of mounting blocks is positioned on a side of the first mounting member away from the second mounting member, and the other one of the pair of mounting blocks is positioned on a side of the second mounting member away from the first mounting member.

7. The transferring mechanism of claim 6, wherein the first mounting member comprises a first positioning portion and a pair of first slave portions positioned at opposite ends of the first positioning portion, opposite ends of the first conveying member are mounted on the pair of first slave portions, the first driving member is connected to the pair of first slave portions, and the first driving member rotates the pair of first slave portions, thereby driving the first conveying member to move.

8. The transferring mechanism of claim 7, wherein the second mounting member comprises a second positioning portion and a pair of second slave portions positioned at opposite ends of the second positioning portion, opposite ends of the second conveying member are mounted on the pair of second slave portions, the second driving member is connected to the pair of second slave portions, and the second driving member rotates the pair of the second slave portions, thereby driving the second conveying member to move.

9. The transferring mechanism of claim 8, wherein the first positioning portion and the pair of first slave portions define a first receiving chamber, cooperatively, the first conveying member is received in the first receiving chamber, the second positioning portion and the pair of second slave portions define a second receiving chamber, cooperatively, the second conveying member is received in the second receiving chamber.

10. The transferring mechanism of claim 1, wherein the supporting assembly comprises a bottom plate and a supporting member substantially perpendicularly fixed on the bottom plate, and the first transferring assembly and the second transferring assembly are supported by the supporting member.

11. A transferring mechanism, comprising:
a first transferring assembly and a second transferring assembly arranged side by side, a transferring direction of the first transferring assembly opposite to a transferring direction of the second transferring assembly; and
a catcher comprising a pair of mounting blocks, a guiding member, a sliding member, a telescoping member, and a clamping member, wherein one of the pair of mounting blocks is positioned on a side of the first transferring assembly away from the second transferring assembly, the other one of the pair of mounting blocks is positioned on a side of the second transferring assembly away from the first transferring assembly, opposite ends of the guiding member are mounted on the pair of mounting blocks, respectively, and the guiding member is positioned across the first transferring assembly and the second transferring assembly, the sliding member is slidably sleeved on the guiding member, the telescoping member is mounted on the sliding member, the catcher is mounted on the telescoping member for clamping a workpiece on the first transferring assembly, the telescoping member is capable of driving the catcher to stretch perpendicularly to the first transferring assembly, and the sliding member is capable of driving the telescoping member and the catcher to slide along the guiding member, for transferring the workpiece to the second transferring assembly.

12. The transferring mechanism of claim 11, wherein the telescoping member comprises a first driving portion and a telescoping portion, the first driving portion is mounted on the sliding member, the telescoping portion is formed on an end of the first driving portion adjacent to the first transferring assembly, the catcher is fixed on the telescoping portion, and the first driving portion is capable of driving the telescoping portion to telescope perpendicularly to the first transferring assembly.

13. The transferring mechanism of claim 11, wherein the catcher comprises a second driving portion and a clamping portion, the second driving portion is mounted on the telescoping member, the clamping portion is formed on an end of the second driving portion adjacent to the first transferring assembly, and the second driving portion is capable of driving the clamping portion to clamp or release the workpiece.

14. The transferring mechanism of claim 13, wherein the clamping portion comprises a pair of claws.

15. The transferring mechanism of claim 13, wherein each of the sliding member, the telescoping member, and the second driving portion comprises a cylinder.

16. The transferring mechanism of claim 14, wherein the first transferring assembly comprises a first mounting member, a first conveying member, and a first driving member, the first conveying member is mounted on the first mounting member, the first driving member drives the first conveying member to move, the second transferring assembly comprises a second mounting member, a second conveying member, and a second driving member, the second conveying member is mounted on the second mounting member, the second driving member drives the second conveying member to move, the first mounting member and the second mounting member are arranged side by side, a transferring direction of the first conveying member is opposite to a transferring direction of the second conveying member, one of the pair of mounting blocks is positioned on a side of the first mounting member away from the second mounting member, and the other one of the pair of mounting blocks is positioned on a side of the second mounting member away from the first mounting member.

17. The transferring mechanism of claim 16, wherein the first mounting member comprises a first positioning portion and a pair of first slave portions positioned at opposite ends of the first positioning portion, opposite ends of the first conveying member are mounted on the pair of first slave portions, the first driving member is connected to the pair of first slave portions, and the first driving member rotates the pair of first slave portions, thereby driving the first conveying member to move.

18. The transferring mechanism of claim 17, wherein the second mounting member comprises a second positioning portion and a pair of second slave portions positioned at opposite ends of the second positioning portion, opposite ends of the second conveying member are mounted on the pair of second slave portions, the second driving member is connected to the pair of second slave portions, and the second driving member rotates the pair of second slave portions, thereby driving the second conveying member to move.

19. The transferring mechanism of claim 18, wherein the first positioning portion and the pair of first slave portions define a first receiving chamber, cooperatively, the first conveying member is received in the first receiving chamber, the second positioning portion and the pair of second slave portions define a second receiving chamber, cooperatively, and the second conveying member is received in the second receiving chamber.

20. The transferring mechanism of claim 11, wherein the transferring mechanism further comprises a supporting assembly, the supporting assembly comprises a bottom plate and a supporting member substantially perpendicularly fixed on the bottom plate, the first transferring assembly and the second transferring assembly are supported by the supporting member.

* * * * *